United States Patent

Furlong et al.

Patent Number: 5,605,010
Date of Patent: Feb. 25, 1997

[54] WATERING STAKE AND TREE SUPPORT

[76] Inventors: Laurence L. Furlong; Dennis W. Morse, both of P.O. Box 375, Columbus, N.M. 88029

[21] Appl. No.: 560,816

[22] Filed: Nov. 20, 1995

[51] Int. Cl.$^6$ .................................................. A01G 29/00
[52] U.S. Cl. .................................................. 47/48.5; 47/47
[58] Field of Search ......................... 47/48.5 M, 48.5 G, 47/27, 42, 43

[56] References Cited

U.S. PATENT DOCUMENTS

| | | | |
|---|---|---|---|
| 1,031,941 | 7/1912 | Lanham | 47/48.5 M |
| 3,345,774 | 10/1967 | Delbuguet | 47/48.5 M |
| 3,579,908 | 5/1971 | Morgan | 47/48.5 G |
| 4,745,706 | 5/1988 | Muza | 47/48.5 M |
| 4,870,781 | 10/1989 | Jones | 47/48.5 M |
| 4,922,653 | 5/1990 | Stone | 47/48.5 M |

FOREIGN PATENT DOCUMENTS

| | | | |
|---|---|---|---|
| 164374 | 4/1949 | Austria | 47/48.5 M |
| 1226735 | 9/1987 | Canada | 47/27 C |
| 1748739 | 7/1992 | Russian Federation | 47/48.5 M |

*Primary Examiner*—Henry E. Raduazo

[57] ABSTRACT

A single watering stake with a tree dual support; providing a sustainable level of saturation for root growth through one staking point and an upper geometric design allowing a tree to obtain optimum dual support.

The watering stake, made of polyvinylchloride driven into the ground, with the use of a pounding cap to prevent blossoming of the stake, penetration of the ground provided through a molded pointed iron piercing end with two anchor fins. Six egress holes will be connected to inner hollow shaft leading to hose or drip coupling.

Furthermore the ground stake is connected to above-ground stake segments by means of straight open ended junctions. The double staking capabilities are achieved through the use of a one-hundred-eighty degree tubular lateral arc connected to the main support by means of a ninety degree open ended junction. The tubular arc will be inserted into said junction directly above the approximate 'whip point' of the tree. The lateral arc will provide tie nipples at both the outer and inner points of said arc from whence an elastic plant tie will be anchored to the tree, thusly allowing wind movement and 360 degrees of photosynthesis on the bark while providing optimum support.

1 Claim, 3 Drawing Sheets

FIG. 3 [50-50]

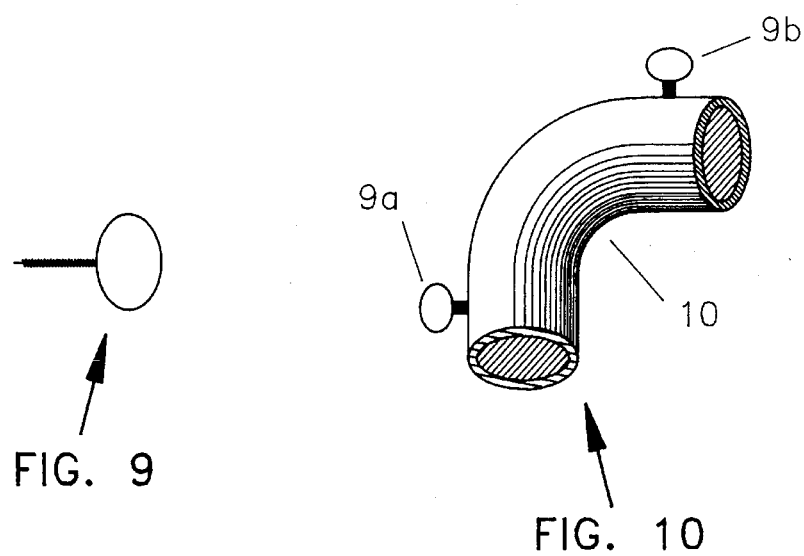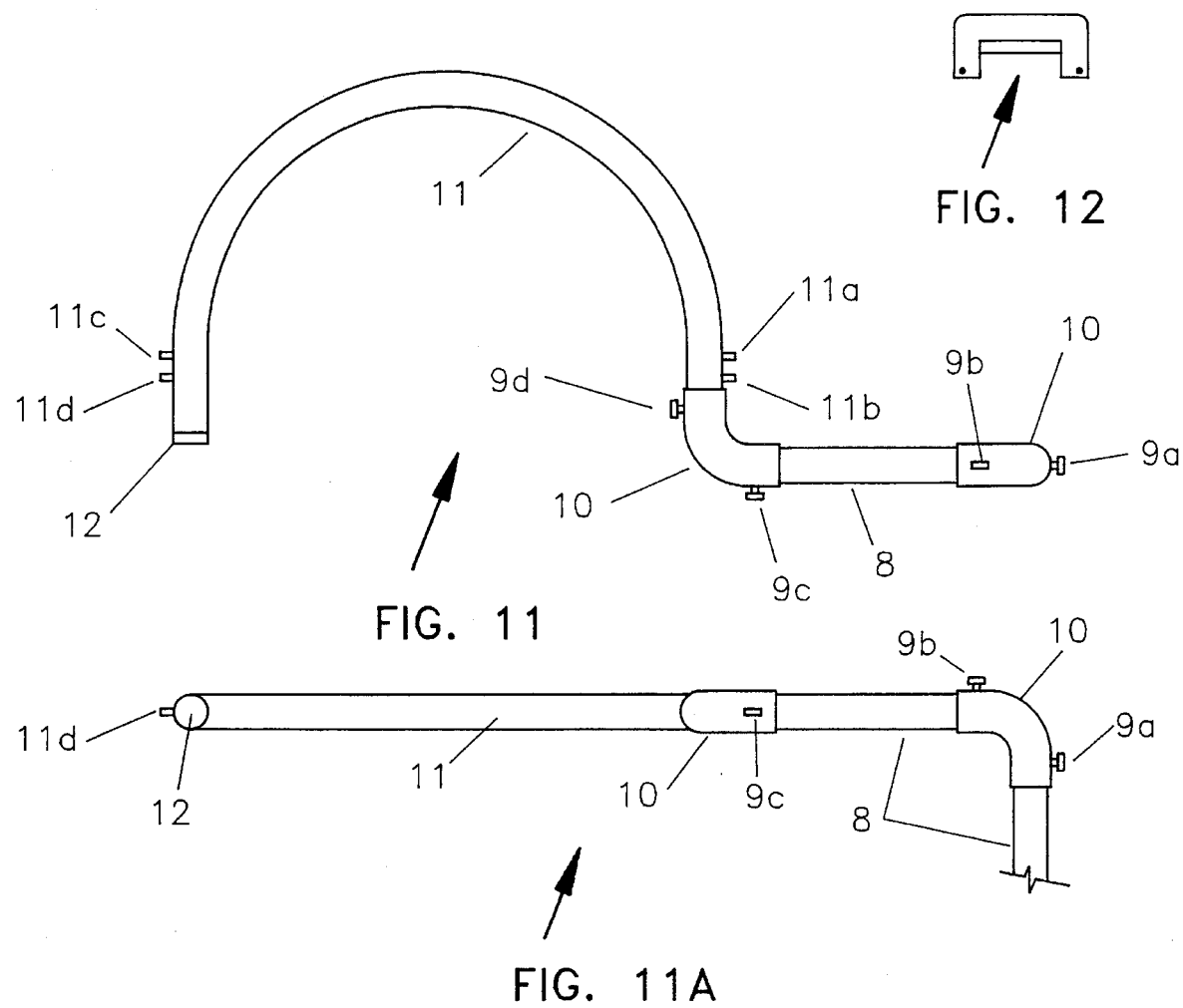

5,605,010

WATERING STAKE AND TREE SUPPORT

FIELD OF THE INVENTION

Plant Husbandry

Past Practice

In past practice trees have suffered major growing disadvantages, from improper staking methods and/or lack of materials and a knowledge in the use of said materials. For instance, they may be singly staked, which requires running the stake directly opposite the tree trunk; this results in damaging the bark and cambium layer of young trees and inhibits photosynthesis of the tree trunk, on one side of the tree. Plant auxins and lignins produced by photosynthesis and movement respectfully are inhibited by this single staking method.

Furthermore dual staking methods are costly both in time and materials, thereby creating a market environment conducive to the single stake method and the unhealthy trees produced by such. Refering to U.S. Pat. No. 5,199,677 to Sessions in 'summary of the invention' the proper staking method is described utilizing two stakes and most often a 1×4 board nailed across the stakes near their top. This method stabilizes a tree however can also cause severe damage to the bark and cambium layer of the tree.

Inasmuch Session's patent addresses the problem of damaging the bark and cambium layer and allows for photosynthesis and movement of the tree; it does not address the market economy leading to a one stake method, nor to the scarcity of timber available for staking. Neither does it allow for recovery of timber materials which most often rot around the basal portion and end up being discarded.

Heretofore it has been the practice to utilize multiple staking points to achieve both proper staking and root watering. Referencing U.S. Pat. No. 4,870,781 to Jones wherein 'background of the invention' it is stated "nothing has been heretofore available to simultaneously perform the dual function of supporting and nourishing the tree." However Jones patent does accomplish this simultaneous function, it also requires three staking points, three combination tree support feeder stakes, plus additional accoutrements, such as wire and padded rings to encircle the tree. To this end our patent has been devoted to address all areas concerned.

SUMMARY OF THE INVENTION

The "Watering Stake and Tree Support" performs two main functions, deep root watering and the upper support provides dual staking capabilities, all inclusively done through one staking point. The subsurface watering stake, constructed of polyvinylchloride and equipped with a molded iron piercing end, may be driven into the ground approximately eighteen inches deep through the use of a pounding cap. Said pounding cap will be constructed of molded iron, conforming to the outer dimensions of the watering stake, thereby preventing blossoming and insuring an uniform fit with the open ended junction connecting upper support portions to said watering stake. The pounding cap contains a thick inner washer and will be fitted with two wires, approximately two and a half inches in length, on opposite sides of the pounding cap, each wire will have at it's end a circular ring, coated with a pliable rubber coating, capable of fitting the thumb and finger of choice through, while gripping the stake with remaining fingers. This method, will provide not only a method of preserving the roundness of the connecting joint, but, also a degree of safety for the installer. In addition the driving of the stake will permit the installer to bend to one knee while installing, rather than climbing a stepladder, or reaching awkwardly over head to pound in the stake and thusly creating a much safer atmosphere deterring falls and or back problems.

The placement of the watering stake will be in direct relation, for optimum stabilization of the tree trunk, and must be determined by installer measuring distance from tree trunk. The placement of the watering stake, should be with the watering outlets pointing to the outer root zones on either side of the tree, with the tree directly lined between said outlets. The watering stake, being approximately twenty-four inches in length, should be driven approximately eighteen inches into the soil, depending on soil conditions, thusly leaving six inches above ground for hose connection and connection to upper support segments.

The main support is comprised of segmented elongate tubular polyvinylchloride, or like material, of predetermined lengths and is connected, one segment to the next, by means of straight opened ended junctions, also constructed of a durable polyvinylchloride, or like material. Upper support installation requires only sliding open ended junction over watering stake and then succeeding one foot elongated tubular segments into open ended junctions and so on until optimum heighth is reached. Upon reaching optimum heighth the ninety degree open ended junction is slid on and the tubular one-hundred-eighty degree lateral arc is slid into the open ended junction. The arc being set in the proper position the self tapping thumb set screws may then be installed, through the junction into the one-hundred-eighty degree arc, preventing vertical movement and through the main elongate tubular support preventing horizontal movement.

After determining the "whip point" of the tree, elastic plant tie is then secured slightly above that point and from outer end of the one-one-hundred-eighty degree lateral arc, utilizing non-slippage nipples at that point and at set point of open ended ninety degree junction. The addition of the horizontal support, requires one additional ninety degree open ended junction, with thumb set screws.

Inasmuch as the possibility, that any slip-junctions may attempt to rotate, or come loose in high winds, or heavy rains, a drop of PVC glue may be placed at the relative outermost seams of the junctions and will thus prevent such dislocation and/or rotation. The glue will be removable, through the use of existing glue solvents readily available on the market, when the proper time for recovery has come. The self tapping thumb screws are set at extreme stress points. The dual support is provided by the upper support and one-hundred-eighty degree lateral arc combination, both made of a durable tubular polyvinylchloride, or like material, of sufficent strength to withstand high winds and drenching rain. The smooth rounded sides, of the elongate tubular upper support and one-hundred-eighty degree lateral arc, make the possibility of damaging the tree highly unlikely even if the supporting plant tie should fail. The placement of the end cap, over the end of the one-hundred-eighty degree arc, closes the system and adds aesthetic appeal.

Since the construction material is of polyvinylchloride or, like material, the segments may be cut, by hacksaw or PVC pipe cutter, to achieve exact location of the one-hundred-eighty degree lateral arc setting. Additionally a horizontal extension is an added option, for extending staking area to a more stabilized region when necessary. A normal vertical segment, of the main elongate tubular support, may be used to act as the horizontal support. The upper support, can be recovered from ninety days to six months and the lower watering stake is recoverable at the owners discretion. All parts may be used again and again and when their life cycle runs out, they can me melted and used again. Total recovery, without material loss and only a small expenditure of energy for recycling.

BRIEF DESCRIPTION OF THE INVENTION

Figure 3:
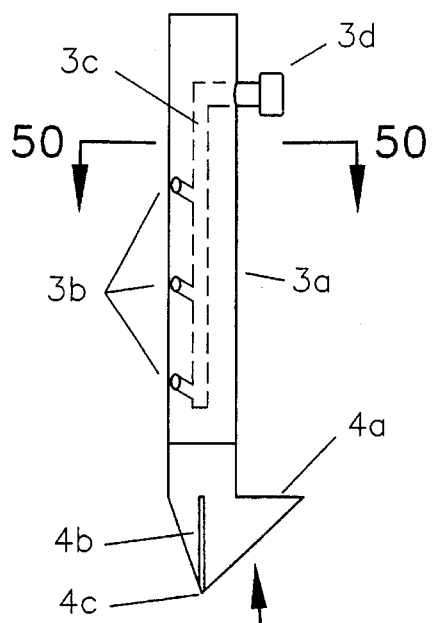

FIG. 3 is a Front Elevation of the watering stake. It depicts the pointed molded iron piercing end, with stabilizing fins FIG. 4 (FIG. 3 molded into FIG. 4) and their directional relationship with the six watering outlet holes. Thus in turn, shows the interconnection between the inner watering shaft and the water inlet coupling. FIG. 3 [50—50] is a cross-section looking down on the watering stake and showing the relation between the anchoring fins and the water outlet arrays exiting from the central watering shaft, according to the present invention.

Figure 4:
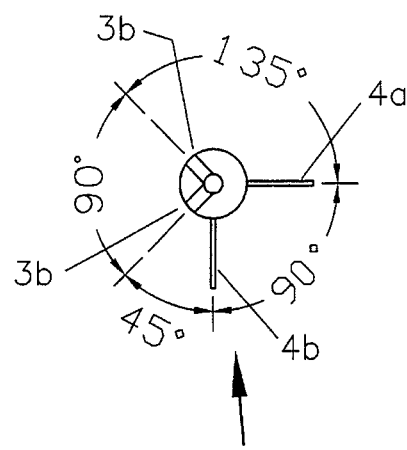
Figure 4:
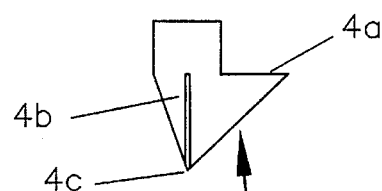

FIG. 4 is a Front Elevation of the iron piercing end, of the watering stake and the relationship of the anchor fins and piercing point, according to the present invention.

Figure 5:
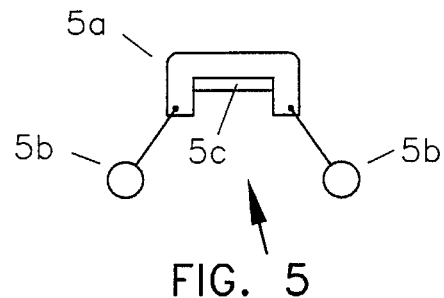

FIG. 5 is a Front Elevation of the pounding cap and the wire ring arrangement, (for thumb and finger of choice to grasp stake) that helps prevent any movement of the cap, while being pounded into the ground; a thick rubber washer is inserted into the pounding cap, according to the present invention.

Figure 6:
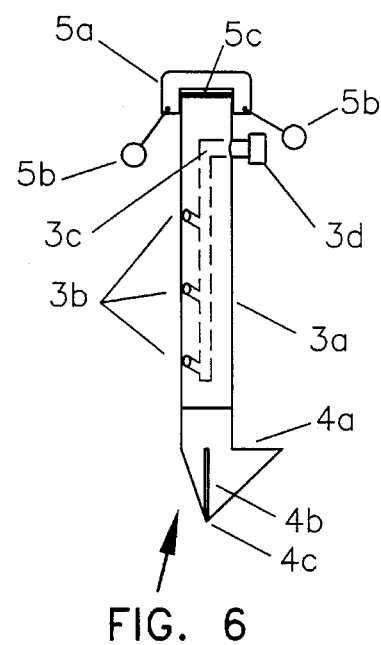

FIG. 6 is a Front Elevation of the mounted pounding cap and it's relation to the watering stake, according to the present invention.

Figure 7:
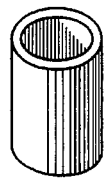

FIG. 7 is a Plain View of a straight open ended junction, according to the present invention.

Figure 8:

FIG. 8 is a Plain View of the main elongate tubular support segment, that inserts into the open ended junction, (also used as horizontal support), according to the present invention.

FIG. 9 is a Plain View of one of the thumb set screws, according to the present invention.

FIG. 10 is a Side Elevation of an 90 degree open ended junction, with thumb set screws inserted, according to the present invention.

Figure 2:
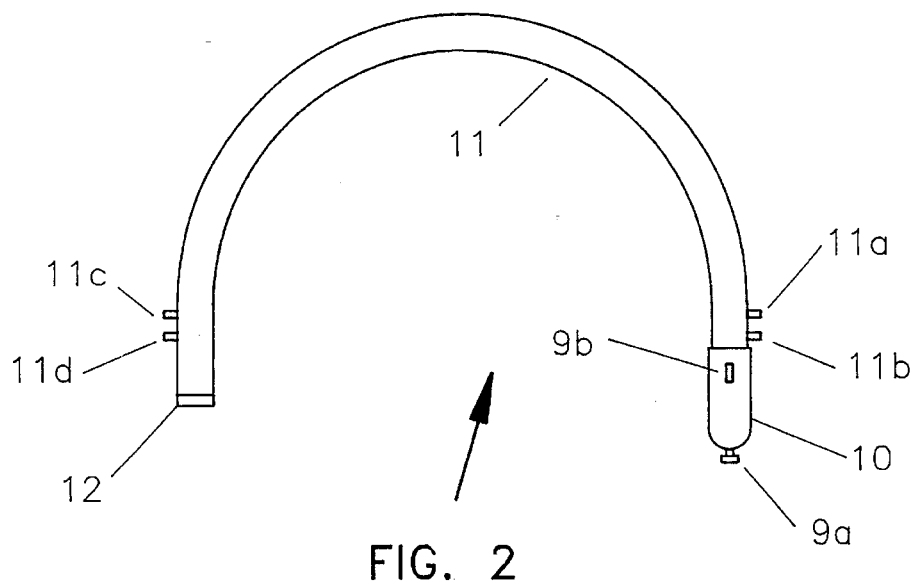
FIG. 2 is a Top View of the one-hundred-eighty degree arc, with nipples and end cap showing, inserted into an open ended junction, with self-tapping thumb set screws, according to the present invention.

FIG. 11 relating to FIG. 2 is a Top View of the one-hundred-eighty degree lateral arc, for the purpose of exhibiting it's extension capabilities, in relation to the ninety degree open ended junction FIG. 10 with set screws, also to show the relative positioning of the tie nipples, according to the present invention.

Figure 1:
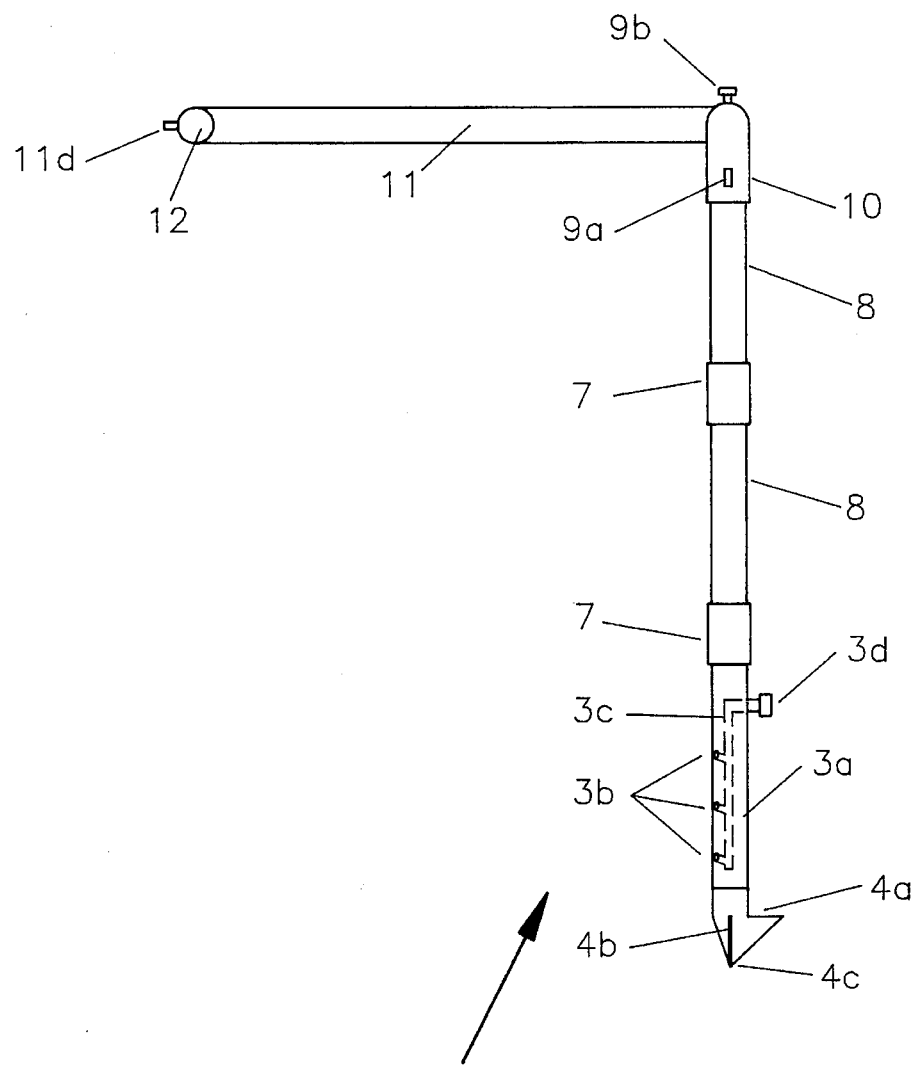
FIG. 1 is a Front Elevation illustrating the "Watering Stake and Tree Support", assembled and showing the watering stake in it's relation to the one-hundred-eighty degree arc, according to the present invention.

FIG. 11A is a Front Elvevation relating to FIG. 1, with the use of an horizontal extension to increase staking capabilities, to overcome in the field obstacles, according to the present invention.

FIG. 12 is a Front Elevation of the end cap, which fits over the end of the arc, for closure of the system and aesthetic appeal, according to the present invention.

DETAILED DESCRIPTION OF THE INVENTION

Referring foremost to the detailed drawings of FIG. 1, a Front Elevation which depicts the "Watering Stake and Tree Support", constructed of polyvinylchloride or like material, in an assembled fashion with FIG. 3 the watering stake driven into the ground, piercing of the ground being done by FIG. 4 the iron piercing end, at an appropriately measured distance from the tree. FIG. 3 #3a is comprised of a main elongate body of polyvinylchloride, of tensile strength to withstand driving blows of a sledge hammer. FIG.3 #3b are the egress holes, consisting of two linear arrays of three holes each, starting two inches above FIG. 4 and spaced linearly three inches apart and horizontally starting from FIG. 4 #4b going clockwise forty-five degrees, starts the first array of egress holes; continuing clockwise ninety degrees, or counter clockwise one-hundred-thirty-five degrees from FIG. 4 #4a, is the point of the second array of egress holes (NOT SHOWN). These are set to have the tree, being staked, as the central focal point between the two arrays and are drilled at a fifteen degree downward angle, to prevent lodging of soil particles, ie. rocks and other debris in the egress holes during ground insertion. FIG. 3 #3c is the central watering shaft leading to FIG. 3 #3d the inlet coupling. FIG. 3 is molded into FIG. 4 #4c, the piercing iron end of the watering stake, FIG. 4 #4a and #4b are the anchor fins, set ninety degrees apart, with #4a lined directly beneath the inlet coupling FIG. 3 #3d and FIG. 4 #4b clockwise from #4a. The anchor fins are approximately three inches in breadth and taper at an approximate forty-five degree angle to FIG. 4 #4c, the piercing point. FIG. 7 is an open ended junction which slips over FIG. 3 and accepts insertion of FIG. 8, a one foot long segment of tubular construction of polyvinylchloride, comprising the main elongate tubular support intersperced with FIG. 7 open ended junctions, to reach the proper staking point. At the properly figured heighth, FIG. 10 the ninety degree junction, with self tapping thumb screws FIGS. 9 #9a and #9b, will be slipped over FIG. 8 and FIG. 9 #9a is tightened. FIG. 11 the one-hundred-eighty degree arc, is then inserted into FIG. 10 and centered accordingly around the tree to be staked and then FIG. 9 #9b is tightened. FIG. 11 #11d tie nipple is showing and must be referred to FIG. 2, for full viewing of the nipple arrangement, (since nipples #11a,b,c) are not shown in FIG. 1. FIG. 12 the end cap is placed over the end of FIG. 11 for closure.

FIG. 2 relating to FIG. 1 is a Top View of the one-hundred-eighty degree arc FIG. 11, with #11a,b,c,d, tie nipples showing, (the preplanned elastic plant tie will run between these nipples and around tree to be staked, a double wrapping method is recommended), and FIG. 11 inserted into an open ended junction FIG. 10, with set screws FIG. 9 #9a (and 9b not shown but both metal self-tapping thumb screws) tapped in and the system closed with FIG. 12 the end cap.

FIG. 3 relating to FIG. 1 is the watering stake, depicted by itself with #3a being the polyvinylchloride body, which is of such density to withstand driving blows. FIG. 3 #3b is the first array of egress holes, drilled at a 15 degree downward slope, with the second array, (not shown), being 90 degrees clockwise from the array featured. These egress holes come from the main water shaft FIG. 3 #3c, which in turn is fed by FIG. 3 #3d the inlet coupling, which can be either a hose or drip coupling. FIG. 3 is molded into an iron piercing cap FIG. 4, which is equipped with two anchor fins 90 degrees apart, with the first #4a being lined directly below the inlet coupling, which always faces away from the tree, the second fin #4b, being 90 degrees clockwise from #4a, thusly providing anchor support from all directions. The anchor fins FIG. 4 #4a and #4b protrude out three inches and taper diametrically to the bottom piercing end FIG. 4 #4c. FIG. 3 [50—50] is a sectional view of the watering stake, shown from the top down and depicting the inner watering shaft FIG. 3 #3c and its internal network relationships, between arrays #3b the egress holes and the anchor fins FIG. 4. #4a and #4b.

FIG. 4 is the iron piercing cap, relating to FIG. 1 showing the iron piercing end #4c and the two anchor fins #4a and #4b, both being set 90 degrees apart, with #4a set directly beneath FIG. 3 #3d and #4b set clockwise from that point and both anchor fins being three inches in breadth and tapering diametrically to the piercing end of the cap #4c, this geometrical configuration should provide support from stress from any given angle.

FIG. 5 is the pounding cap #5a, that slips snugly over the top of FIG. 3 and is equipped with a thick rubber washer #5c, to help prevent blossoming of the upper part of FIG. 3. #5b is a wire ring arrangement, (the rings to be rubber coated), to fit thumb and finger of choice through while grasping the stake during pounding and helping to prevent bouncing of the pounding cap #5a.

FIG. 6 is the pounding cap FIG. 5 showing all elements, including #5a,b,c; mounted on FIG. 3 showing all elements, including #3a,b,c,d relating to FIG. 1 and ready to pierce the ground with FIG. 4 showing all elements, including #4a,b,c; reaady to pierce the ground to a depth of approximately 18 inches, leaving the inlet coupling FIG. 3 #3d ideally three inches above ground depending on soil conditions.

FIG. 7 relating to FIG. 1 is a rigid open ended junction, which mounts on FIG. 3 and then acts as a receptacle for the upper tubular segments FIG. 8, which come in one foot long segments of semi-rigid polyvinylchloride to reach, in conjunction with FIG. 7 consecutively joined, the tie point directly above the "whip point" of the tree. At this point FIG. 10, relating to FIG. 1 is slipped over FIG. 8, at a right angle to the tree to be staked, and FIG. 9 #9a (metal self-tapping thumb screw) may be tightened.

FIG. 11 relating to FIG. 2 Top View is the one-hundred-eighty degree arc, with nipples FIG. 11 #11a,b,c,d; showing, inserted into a secondary ninety degree junction FIG. 10 and tightened with FIG. 9 #9d and with FIG. 9 #9c tightened into the horizontal extension FIG. 8, which is the same as FIG. 8 of the main elongate tubular body, and tightened into first FIG. 10 by FIG. 9 #9b, with FIG. 9 #9a showing. FIG. 11A is a portion of the front elevation of FIG. 11, showing the horizontal support FIG. 8 and it's extension capabilities from junction FIG. 10, with thumb set screws FIG. 9 #9a and #9b tapped into FIG. 8, vertically and horizontally respectfully, followed by secondary junction FIG. 10 with FIG. 9 #9c tapped into FIG. 8 horizontal extension and FIG. 9 #9d not showing, but tapped into the one-hundred-eighty degree arc FIG. 11, with #11d showing and #11a,b,c; not showing. FIG. 12 caps off the system through the insertion of FIG. 11 into FIG. 12.

FIG. 12 is the polyvinylchloride end cap which fits over FIG. 11 closing the system and adding aesthetic appeal.

As to the manner of useage and operation of the present invention, the same should be apparent from the above disclosure, and accordingly no further discussion relative to the manner of usage and operation of the present invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships tho those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A kit for forming a watering stake and tree support comprising:

a watering stake having a first pointed end with two anchoring fins positioned at about 90 degree angles to each other, an inner conduit adapted to conduct water, a plurality of egress holes provided along the length of said inner conduit and a coupling adapted to connect said inner conduit to a supply of water, said kit further including a pounding cap having a rubber washer adapted to engage a second end of said watering stake for preventing injury to said stake when driving said stake into the earth;

a plurality of upper support segments;

a plurality of means for engaging each segment with another segment or with the said watering stake; and said kit providing an uppermost support segment in the shape of an 180 degree horizontal arc; and the means for engaging said horizontal arc segment to main upright support segments; and the means to engage at least one part of said upper horizontal arc segment in a supporting relationship with a tree.

* * * * *